(12) United States Patent
Said

(10) Patent No.: US 11,432,681 B2
(45) Date of Patent: Sep. 6, 2022

(54) DEVICE AND METHOD FOR FRYING FOOD ITEM

(71) Applicant: Nawwaf L. Said, Cary, NC (US)

(72) Inventor: Nawwaf L. Said, Cary, NC (US)

( * ) Notice: Subject to any disclaimer, the term of this patent is extended or adjusted under 35 U.S.C. 154(b) by 0 days.

(21) Appl. No.: 17/139,240

(22) Filed: Dec. 31, 2020

(65) Prior Publication Data

US 2021/0298528 A1 Sep. 30, 2021

Related U.S. Application Data

(63) Continuation of application No. PCT/US2020/067328, filed on Dec. 31, 2020.

(60) Provisional application No. 62/993,739, filed on Mar. 24, 2020.

(51) Int. Cl.
| | |
|---|---|
| *A47J 37/12* | (2006.01) |
| *A47J 43/20* | (2006.01) |
| *A22C 7/00* | (2006.01) |
| *B29C 31/00* | (2006.01) |
| *B29C 31/02* | (2006.01) |

(Continued)

(52) U.S. Cl.
CPC .......... *A47J 37/1271* (2013.01); *A22C 7/003* (2013.01); *A22C 7/0038* (2013.01); *A47J 43/20* (2013.01); *B29C 31/006* (2013.01); *B29C 31/02* (2013.01); *B29C 33/442* (2013.01); *B29C 37/0003* (2013.01); *B29C 37/0007* (2013.01); *A22C 7/0076* (2013.01)

(58) Field of Classification Search
CPC ..... A22C 7/003; A22C 7/0038; A22C 7/0023; A22C 7/0046; A22C 7/0076; A22C 7/0084; A22C 7/0015; A47J 37/20; A47J 37/1271; A47J 37/108; A47J 43/20
See application file for complete search history.

(56) References Cited

U.S. PATENT DOCUMENTS

| | | | | |
|---|---|---|---|---|
| 671,788 | A * | 4/1901 | Bach ..................... | A47J 43/282 |
| | | | | 425/284 |
| 1,462,105 | A | 7/1923 | Hart | |

(Continued)

FOREIGN PATENT DOCUMENTS

| | | |
|---|---|---|
| KR | 200457031 Y1 | 12/2011 |
| KR | 101430148 B1 | 8/2014 |

OTHER PUBLICATIONS

ISA/KR; International Search Report and Written Opinion for International Patent Application No. PCT/US2020/067628 dated Apr. 21, 2021, 11 pages.

*Primary Examiner* — Seyed Masoud Malekzadeh
(74) *Attorney, Agent, or Firm* — NK Patent Law

(57) ABSTRACT

Device for dispensing a food item into a hot fluid comprises a bowl having a permanent base and a movable plate positioned about the permanent base. A bottom of the bowl defines an opening for receiving a shaft extending therethrough. The shaft is coupled to the movable plate. A shank is selectively engaged with the bowl, the shank having a handle at a proximal end thereof. A lever is pivotably attached to the shank. The pivotal attachment is spaced apart from the bowl. The lever is detachably coupled to the shaft to impart translation of the movable plate. During operation, the lever is manipulated from a first position to a second position to push the shaft to move the movable plate to thereby eject the food item out of the bowl and into a hot fluid.

12 Claims, 17 Drawing Sheets

(51) Int. Cl.
*B29C 33/44* (2006.01)
*B29C 37/00* (2006.01)

(56) References Cited

U.S. PATENT DOCUMENTS

| | | | | |
|---|---|---|---|---|
| 1,561,558 A * | 11/1925 | Manos | ........... | A47J 43/282 |
| | | | | 425/286 |
| 2,239,046 A * | 4/1941 | Lloyd | ........... | A47J 43/282 |
| | | | | 425/281 |
| 2,669,194 A * | 2/1954 | Brown | ........... | A47J 43/282 |
| | | | | 425/281 |
| 2,756,698 A * | 7/1956 | Eichin | ........... | A47J 43/282 |
| | | | | D7/681 |
| 2,949,629 A * | 8/1960 | Falco | ........... | A22C 7/0015 |
| | | | | D7/672 |
| 4,057,874 A | 11/1977 | Walker | | |
| 4,161,381 A * | 7/1979 | Sciortino | ........... | A47J 43/282 |
| | | | | 425/286 |
| 4,483,240 A * | 11/1984 | Dinh | ........... | A47J 37/1295 |
| | | | | 99/441 |
| 4,656,929 A | 4/1987 | Dinh | | |
| 4,721,449 A * | 1/1988 | Alberts | ........... | A47J 43/282 |
| | | | | 425/286 |
| 6,162,039 A * | 12/2000 | Schwarz | ........... | A47J 43/282 |
| | | | | 425/282 |
| 6,644,179 B1 * | 11/2003 | Kiehm | ........... | A47J 43/288 |
| | | | | 425/282 |
| 7,128,557 B2 * | 10/2006 | Horng | ........... | A47J 43/282 |
| | | | | 425/444 |
| 8,202,073 B1 * | 6/2012 | Kovalevich | ........... | A47J 43/20 |
| | | | | 425/355 |
| 9,687,019 B2 * | 6/2017 | Imlach | ........... | A47J 43/20 |
| 2006/0006581 A1 * | 1/2006 | St. Germain | ........... | A22C 7/0046 |
| | | | | 425/408 |
| 2006/0078642 A1 * | 4/2006 | Palese | ........... | A22C 7/0046 |
| | | | | 425/416 |
| 2007/0261567 A1 * | 11/2007 | Morgan | ........... | A47J 45/061 |
| | | | | 99/422 |
| 2016/0120194 A1 | 5/2016 | Weber | | |
| 2017/0303743 A1 * | 10/2017 | Chaudry | ........... | A47J 36/00 |

* cited by examiner

DEVICE AND METHOD FOR FRYING FOOD ITEM

CROSS-REFERENCE TO RELATED APPLICATIONS

This application claims priority to PCT Patent Application No. PCT/US2020/067628 filed on Dec. 31, 2020, which claims priority to U.S. Provisional Patent Application No. 62/993,739 filed on Mar. 24, 2020, the entire contents of which are incorporated by reference herein.

TECHNICAL FIELD

The present invention relates generally to food preparation, and particularly to a device and method for dispensing a food item to be cooked into hot oil or other hot fluid.

BACKGROUND

The statements in this section merely provide background information related to the present disclosure and may not constitute prior art.

Food preparation at food preparation establishments such as restaurants, for example, typically involves frying of food items such as patties. To fry a single patty, a foodservice worker typically scoops the underlying food item and shapes it into a patty, in case it is not pre-shaped, and drops the patty into hot oil.

At the instant when the patty is being dropped into hot oil, the hand of the worker typically gets dangerously close to the hot oil. This can result in hot oil getting splashed on the hand of the worker at the instant when the patty drops into the hot oil. The splashing oil can cause a burn injury. The likelihood of the hot oil getting splashed is higher during busy times such as lunch breaks due to piling up of food orders. The likelihood of the hot oil getting splashed on the hand of the worker is also higher when the worker is new to the trade or is otherwise a novice or inexperienced worker. The issue of oil splashing in hand is also a concern in home kitchens when patties are being fried.

Opportunities exist for providing improvements that increase the efficiency as well as the safety associated with frying or otherwise cooking food items such as patties in food establishments and home kitchen settings.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In accordance with the purposes of the disclosed devices and methods, as embodied and broadly described herein, the disclosed subject matter relates to devices and methods of use thereof. Additional advantages of the disclosed devices and methods will be set forth in part in the description, which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

Implementations may include one or more of the following features. Disclosed herein is a device for dispensing a food item into a hot fluid for cooking therein. In various embodiments, the device comprises a bowl having a permanent base and a movable plate positioned about the permanent base. A bottom of the bowl defines an opening for receiving a shaft extending therethrough. The shaft is coupled to the movable plate. The device further comprises a shank selectively engaged with the bowl such that a second bowl with a different shaped may be replaceably engaged with the shaft. The shank has a handle at a proximal end thereof. The device also comprises a lever pivotably attached to the shank at a medial portion thereof. The pivotal attachment is spaced apart from the bowl. The lever is detachably coupled to the shaft to impart translation of the movable plate. During operation, the lever is transferable between a first position in which a food item is contained within the bowl and a second position in which the lever is manipulated to push the shaft to move the movable plate to thereby eject the food item out of the bowl and into a hot fluid.

Disclosed herein is a device for shaping a food item to be dispensed into a hot fluid for cooking therein. In various embodiments, the device comprises a food shaping plate, a holder, and a clip interconnecting a back side of the food shaping plate to the holder. The holder is configured for insertion between fingers for holding the device in hand when a food item is being shaped against the food shaping plate. The clip is configured for insertion into a rim of a container bearing the food item to be shaped.

Disclosed herein is a method of shaping and dispensing a food item into a hot fluid for cooking therein. The method comprises providing a first device. The first device comprises a bowl having a permanent base and a movable plate positioned about the permanent base. A bottom of the bowl defines an opening for receiving a shaft extending therethrough. The shaft is coupled to the movable plate. A shank selectively engages with the bowl such that another bowl with a different shaped may be replaceably engaged with the shaft, the shank having a handle at a proximal end thereof. A lever pivotably attaches to the shank at a medial portion thereof. The pivotal attachment is spaced apart from the bowl. The lever is detachably coupled to the shaft to impart translation of the movable plate. During operation, the lever is transferable between a first position in which a food item is contained within the bowl and a second position in which the lever is manipulated to push the shaft to move the movable plate to thereby eject the food item out of the bowl and into a hot fluid. The method further comprises providing a second device. The second device comprises a food shaping plate, a holder, and a clip interconnecting a back side of the food shaping plate to the holder. The holder is configured for insertion between fingers for holding the device in hand when a food item is being shaped against the food shaping plate. The clip is configured for insertion into a rim of a container bearing the food to be shaped. The method also comprises filling the bowl of the first device with the food item, shaping the food item into a patty shape by pressing the food item against the food shaping plate of the second device, transferring the lever from the first position to the second position by manipulating the lever to push the shaft to move the movable plate, and ejecting the food item out of the bowl and into a hot fluid.

BRIEF DESCRIPTION OF THE DRAWINGS

In order to describe the technical solutions of the examples of the present invention more clearly, the figures required to be used for the examples will be briefly introduced below. It should be understood that the following figures only show some examples of the present invention, and thus shall not be construed as limiting the scope thereof; and for a person skilled in the art, further relevant figures could also be obtained according to the figures without using inventive efforts.

DETAILED DESCRIPTION OF THE EMBODIMENTS

Figure 1:
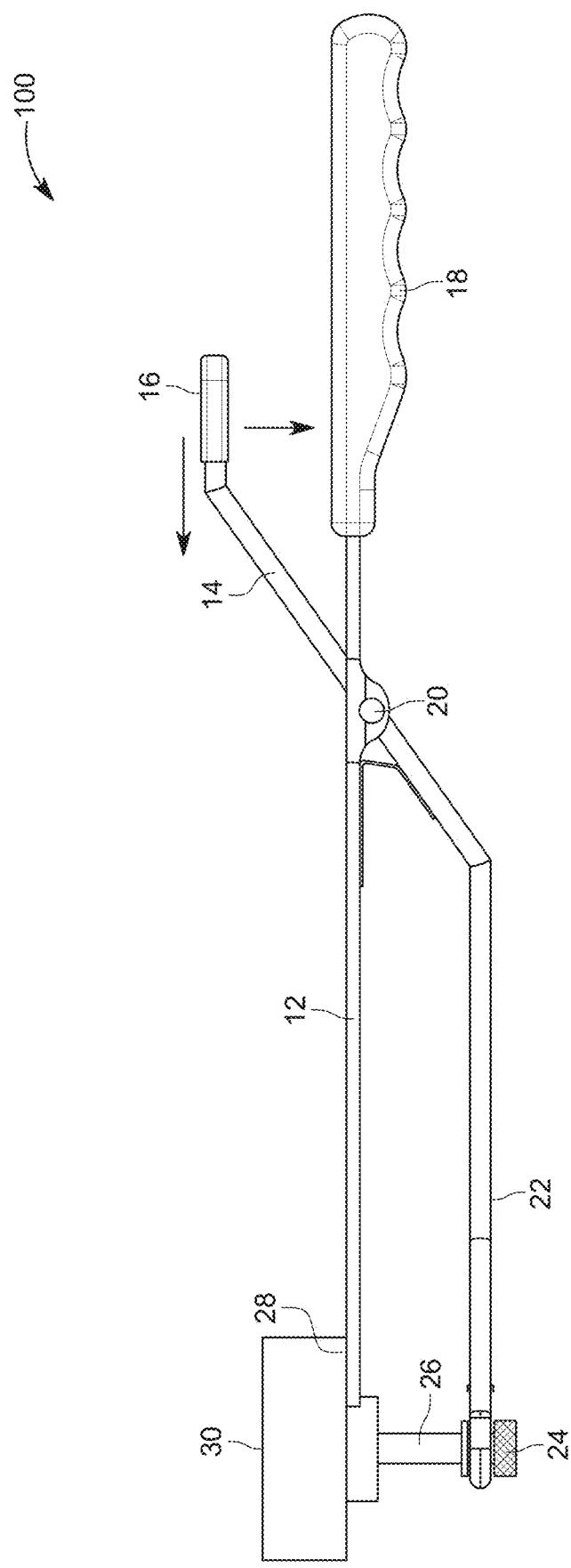
FIG. 1 is a side plan view of a scooping device for dispensing a foot item into a hot fluid for cooking therein, according to at least one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Embodiments of the presently disclosed subject matter provide for an improved scooping device that can be advantageously used for safely frying of food items such as patties in a hot fluid such as oil, fat or boiling water. Embodiments of the presently disclosed subject matter provide for an improved tamp device for assisting in shaping the food item to be dispensed into the hot fluid. Embodiments of the presently disclosed subject matter can reduce and eliminate the possibility of hot oil getting splashed on the hand of a person at the instant when the patty drops into the hot oil. Embodiments of the presently disclosed subject matter can prevent the hand of the worker getting dangerously close to the hot oil when the food item is being dropped into the hot fluid. Embodiments of the presently disclosed subject matter can further provide for improved hygiene associated with the preparation of food items. Embodiments of the presently disclosed subject matter can also provide for faster and efficient frying of a batch of food items such as patties, dumplings and falafels, for example. Embodiments of the presently disclosed subject matter can otherwise provide for safe frying or broiling of patties of any kind. Embodiments of the presently disclosed subject matter can be used with hot oil or hot water or any hot liquid.

Embodiments of the presently disclosed subject matter provide for improved safety by way of providing a long shank with handle that separates the bowl holding the food item to be dropped into a hot fluid from the hand of the foodservice worker thereby reducing or eliminating the likelihood of hot oil splashing onto the hand, palm and/or finger of the operator of the device when the food items such as a patty is being dropped into hot oil. Embodiments of the presently disclosed subject matter can accordingly provide for the hand, palm and fingers of the worker to be kept at a distance from the hot liquid and this can advantageously avoid or reduce the chance of hot fluid getting splashed on when the food item is being dropped into the hot liquid. Embodiments of the presently disclosed subject matter can provide safety and ease of use of a patty scooping device for food establishment employees as well as lay people frying or boiling food items at home.

FIGS. 1 through 4 illustrate a scooping device 100 (alternately referred to herein as "device 100", "first device" or simply "device") according to one or more embodiments of the presently disclosed subject matter. As illustrated in FIGS. 1 through 4, device 100 is configured for dispensing a food item into a hot fluid for cooking therein. In various embodiments, device 100 comprises a bowl 30 having a permanent base such as base 28, and a movable plate 42 positioned about base 28. A bottom of the bowl defines an opening for receiving a shaft 26 extending therethrough. Shaft 26 is coupled to the movable plate 42.

In various embodiments, a shank 12 selectively engages with bowl 30 such that a second bowl of a different shape may be replaceably engaged with shank 12. Shank 12 includes a handle 18 at a proximal end thereof. As illustrated in FIG. 1, a handle 18 is positioned on an end of shank 12 that is opposite to an end of shank 12 that selectively engages with bowl 30.

In various embodiments, a lever 14 pivotably attaches to shank 12 at a medial portion of shank 12. The pivotal attachment is spaced apart from bowl 30. Lever 14 is detachably coupled to the shaft 26 to impart translation of the movable plate 42. In one embodiment, the end of lever 14 that is opposite to the end that is closest to shank 12 includes a knob 16. Knob 16 is configured to be operated by a finger or thumb of an operator such as a foodservice worker. In at least one embodiment, lever 14 includes a connecting rod 22 that couples to shaft 26, with connecting rod 22 positioned at an end of lever 14 that is opposite to an end of lever 14 that is closest to knob 16.

Figure 4:
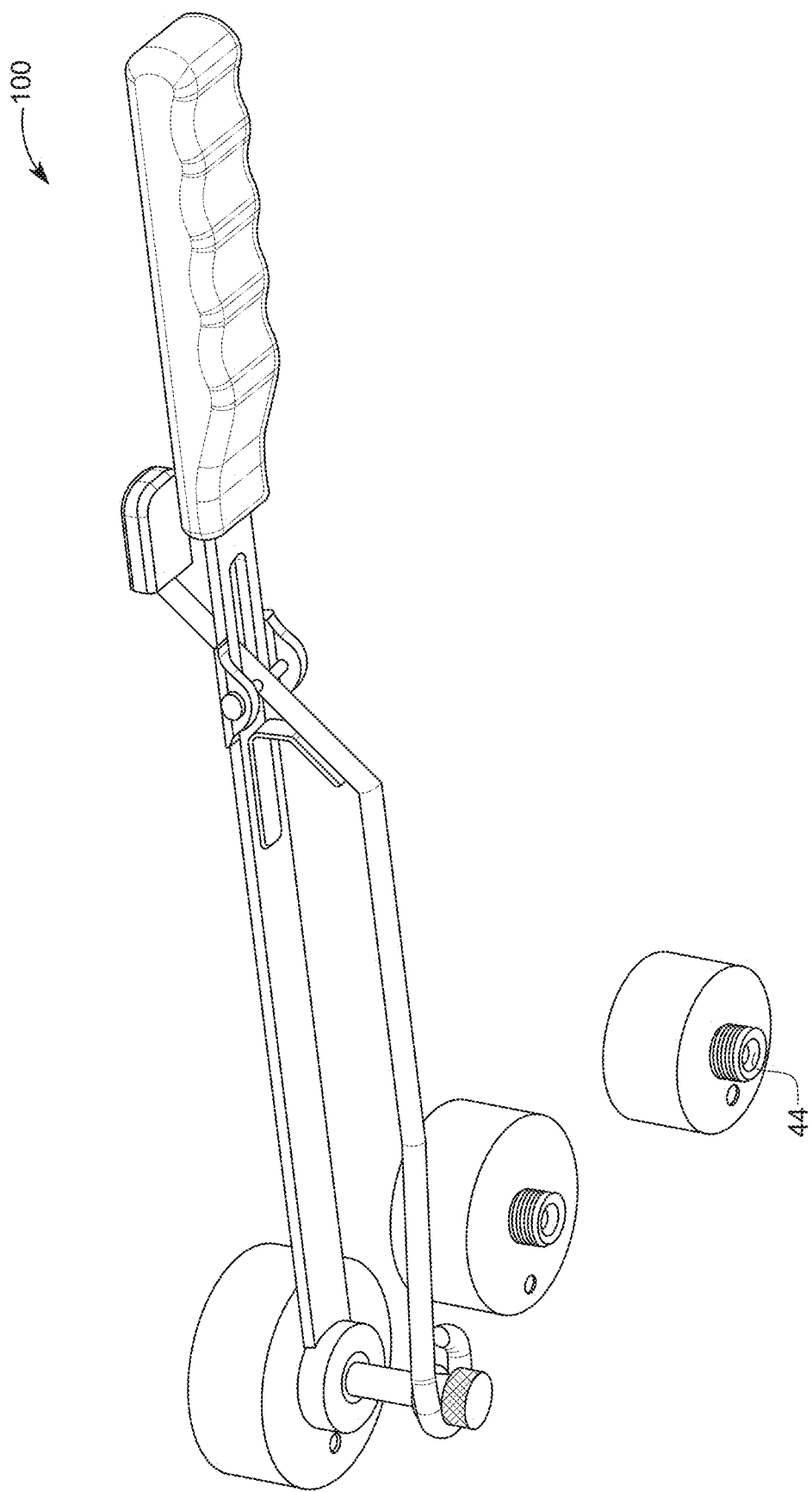
FIG. 4 is a bottom perspective view of a scooping device, according to at least one embodiment.

During operation, lever 14 is transferred from a first position in which a food item is contained within the bowl to a second position in which the lever 14 is manipulated to push the shaft 26 to move the movable plate 42 to thereby eject the food item out of the bowl 30 and into a hot fluid such as oil, fat, or water. Device 100 further comprises a biasing mechanism 44 for transferring the lever from the second position back to the first position wherein the lever is in a disengaged disposition (i.e., when no pressure is being applied on knob 16 of lever 14). In one embodiment, the biasing mechanism can take the form of a compression spring as illustrated in FIG. 4. However, the biasing mechanism can take other forms (e.g., silicone spring, bent spring, etc.). The biasing mechanism may be placed in other locations of device 100. In one embodiment, the biasing mechanism can be in the form of a bent tensile strip such as a metal strip, for example. The biasing mechanism can be positioned in any appropriate location along device 100. For example, the biasing mechanism can be positioned proximal to the medial portion of the shank, proximal to a free end of the shaft, a bottom side of the base, a bottom side of shank 12, and similar other locations. Accordingly, in one embodiment, a bottom side of the base further comprises a biasing mechanism 44 in the form of a compression spring mechanism for biasing the lever from the second position back to the first position when the lever is disengaged; in one embodiment, the compression spring mechanism is positioned proximal to pin 20. In one embodiment, the compression spring mechanism is positioned proximal to the shaft.

Figure 8:
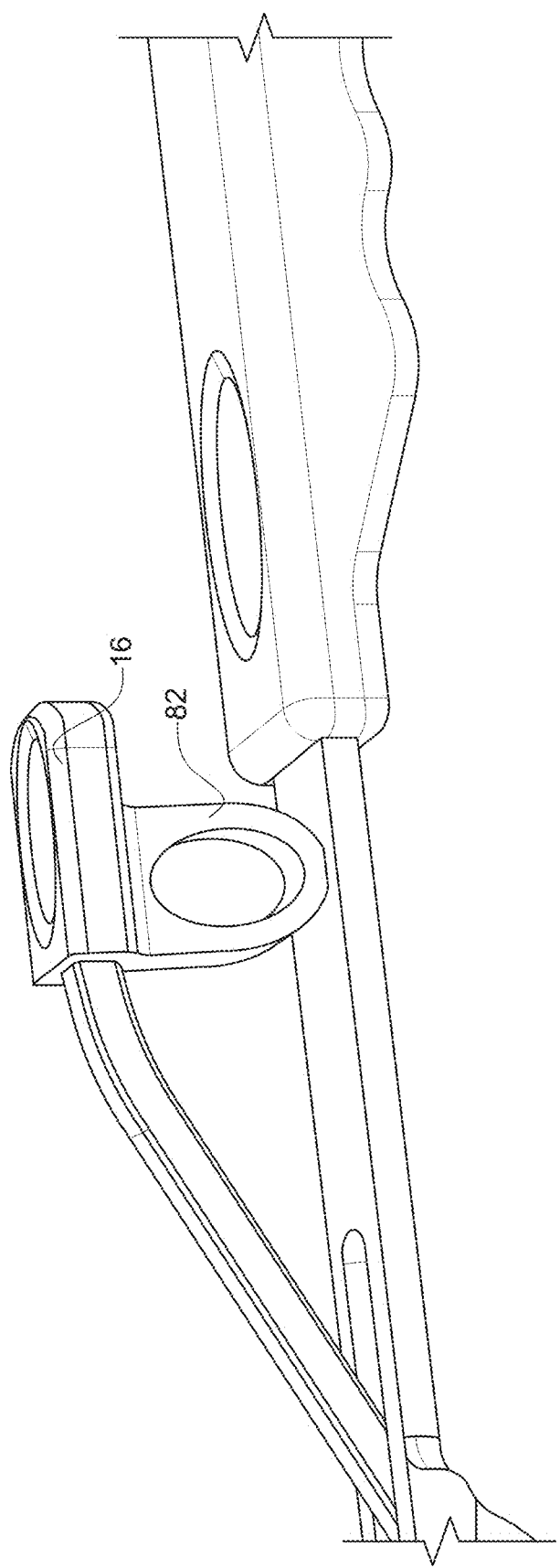
FIG. 8 is a side perspective view of a portion of a scooping device including a silicone spring, according to at least one embodiment.
Figure 9:
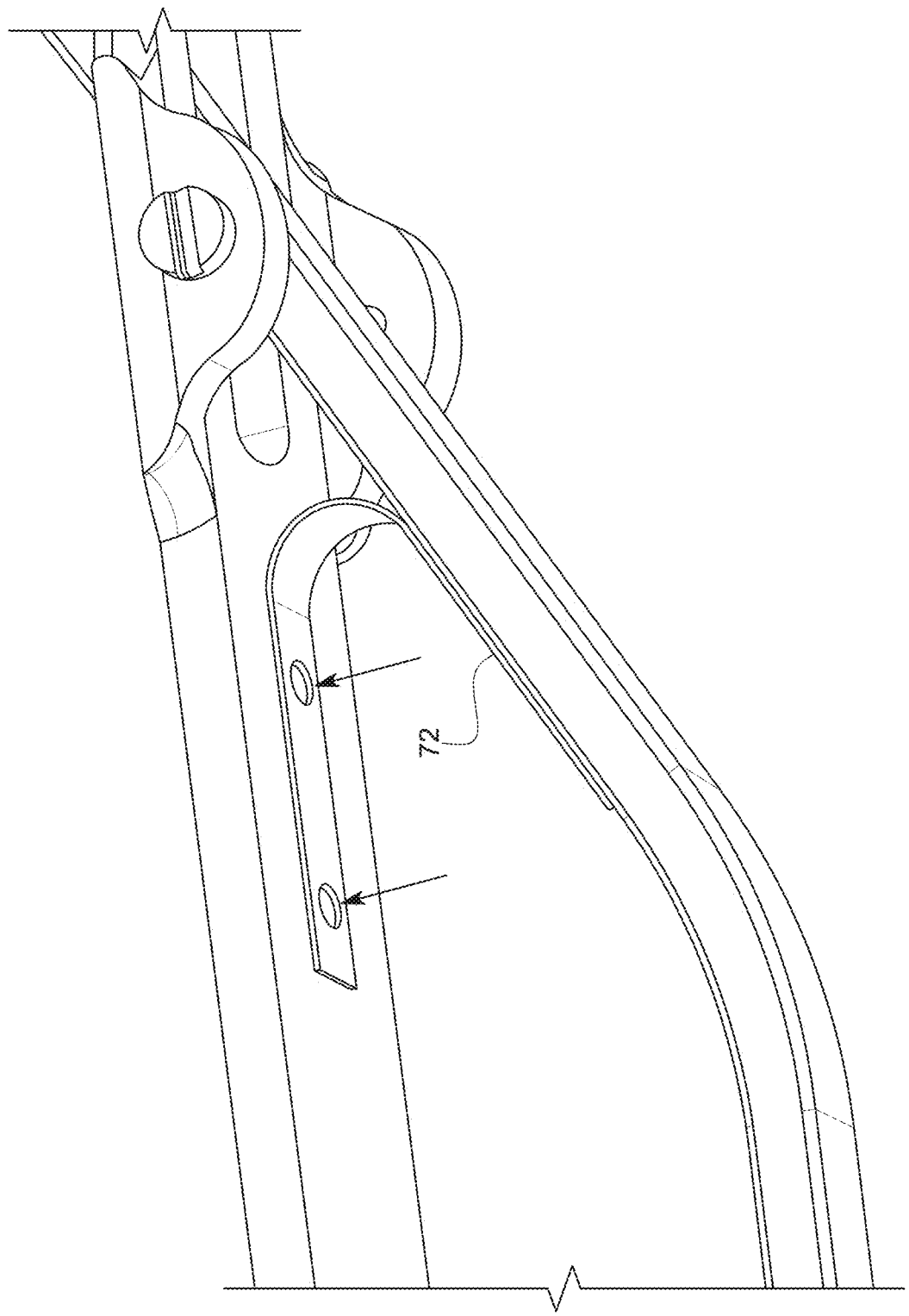
FIG. 9 is a side perspective view of a portion of a scooping device including a bent spring, according to at least one embodiment.
Figure 10:
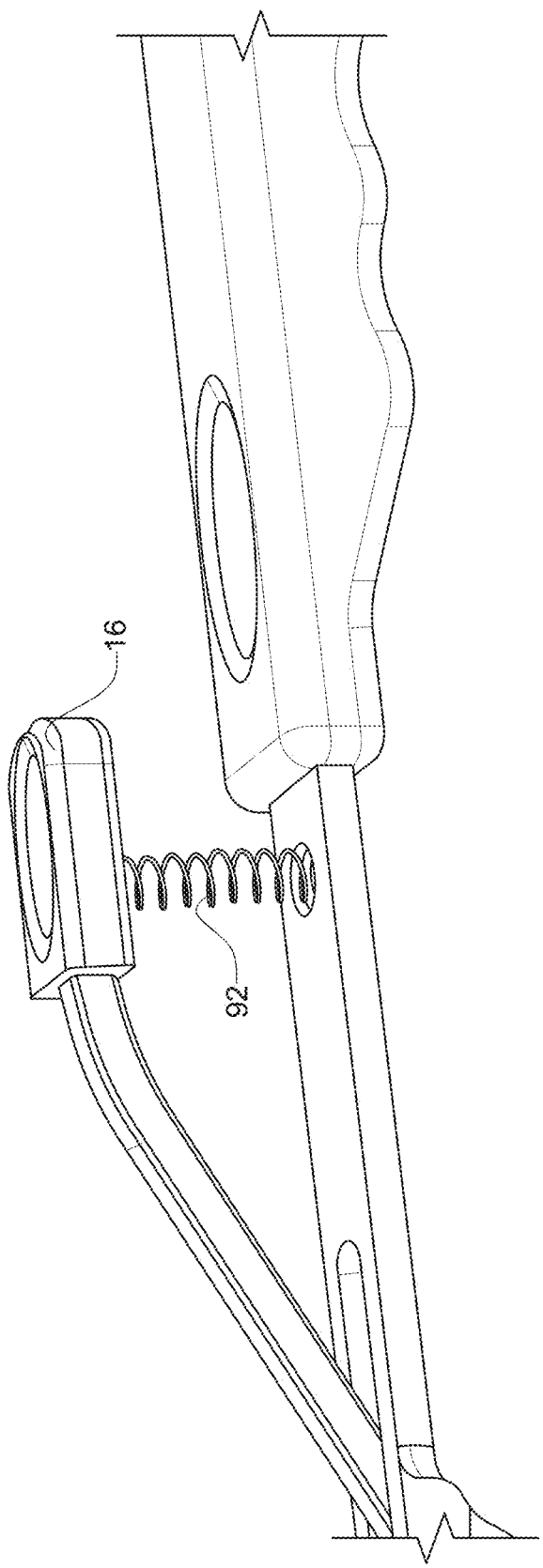
FIG. 10 is a side perspective view of a portion of a scooping device including a compression spring, according to at least one embodiment.

In at least one embodiment, the biasing mechanism of device 100 takes the form of a silicone spring 82 (see FIG. 8). Silicone spring 82 can be integrated into, or otherwise form of part of knob 16. In one embodiment, silicone spring 82 can be molded as part of knob 16. In one embodiment, the biasing mechanism takes the form of a bent spring 72 (see FIG. 9). Bent spring 72 represents a custom bent spring that is screwed on to one or more of shank 12 and lever 14. In one embodiment, the biasing mechanism takes the form of a compression spring 92 (see FIG. 10). Compression spring 92 can be integrated into, or otherwise form of part of knob 16. Accordingly, in various embodiments, the biasing mechanism can be positioned on an underside of the shank, positioned on an underside of a knob provided on the lever, and/or coupled to a bottom side of the base.

Figure 2:
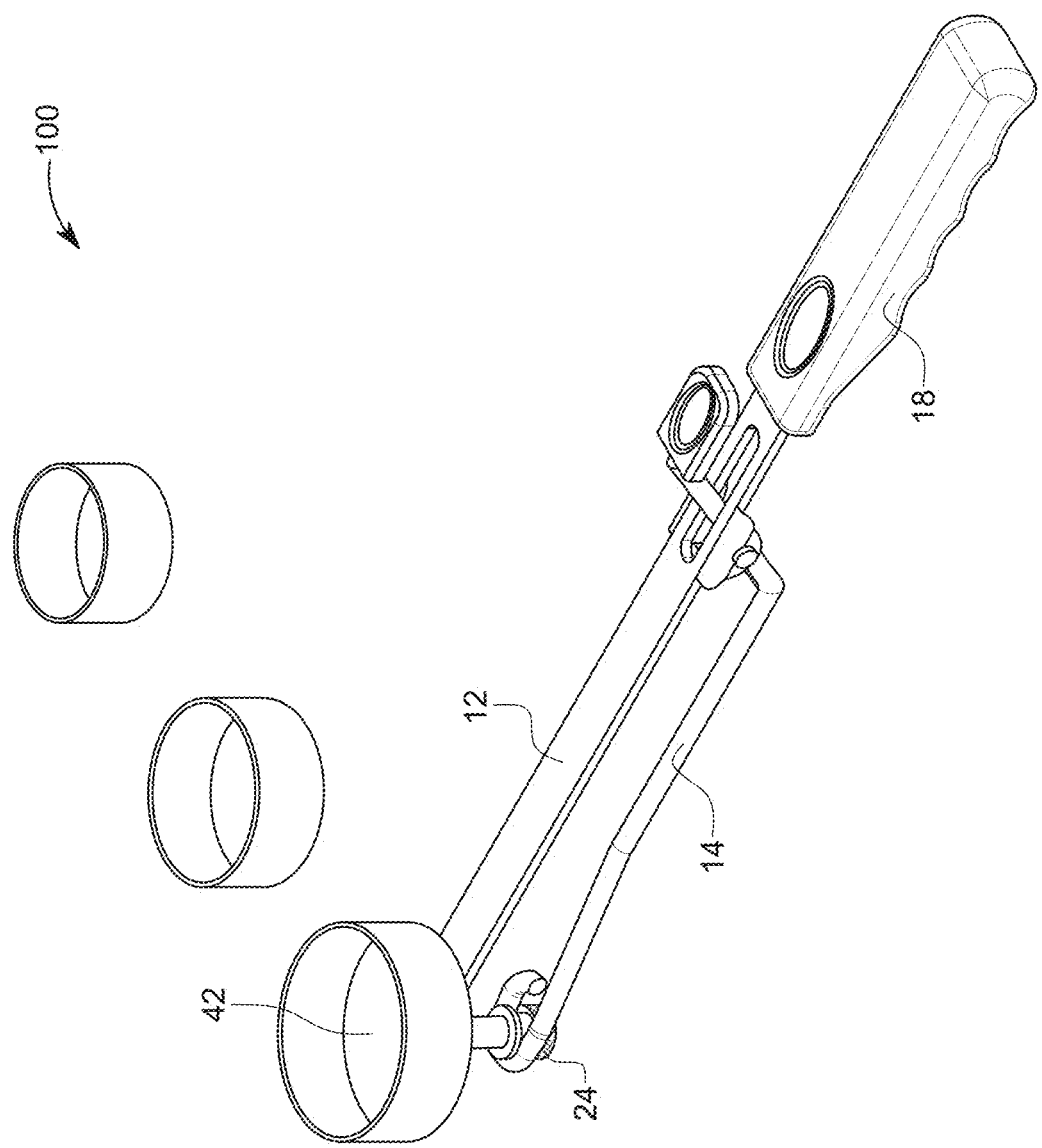
FIG. 2 is a top perspective view of a scooping device, according to at least one embodiment.
Figure 3:
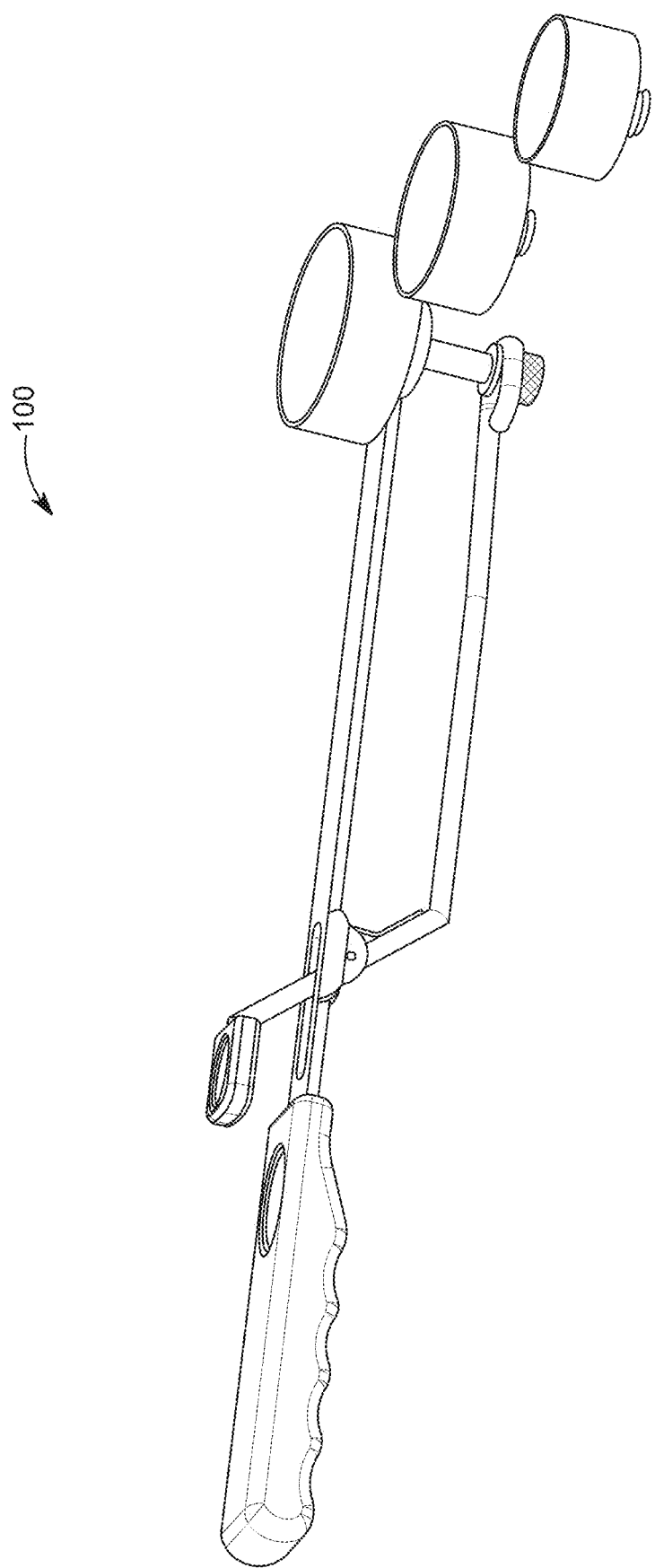
FIG. 3 is a side perspective view of a scooping device, according to at least one embodiment.

In various embodiments, bowl 30 can comprise side walls extending from base 28, with movable plate 42 being capable of resting against base 28. Shaft 26 is attached to a bottom side of movable plate 42. Movable plate 42 is slidable within the side walls. In one embodiment, shank 12 defines an opening at a distal end for receiving the base. In one embodiment, lever 14 can be pivotably attached to the shank by a pin such as pin 20. Lever 14 can include a connecting rod at a distal end, with the connecting rod defining an opening at a free end thereof wherein a securing mechanism 24 removably attaches to the shaft. Whereas FIG. 2 illustrates a securing mechanism 24 in the form of a screw-on set-up, in various embodiments, other types of commonly known technics for removable attachment such as, for example, a clipping mechanism, a locking pin mechanism or a similar other mechanism can also be used.

In various embodiments, lever 14 can be detachably coupled to shaft 26 by securing mechanism 24 comprising a bolt that screws into a free end of the shaft. In one embodiment, shank 12 can further include a channel opening 13 (FIG. 7) for the lever 114 to pass therethrough.

According to at least one embodiment, during operations, the knob is engageable to manipulate from a first position in which the bowl holds a food item therein to a second position in which the connecting rod operates to push the shaft to slide the plate within the side walls to thereby eject the food item out of the bowl and into a hot fluid. In various embodiments, the hot fluid can comprise a cooking oil, a fat, or boiling water.

In at least one embodiment, the selective engagement between the shank and the bowl is by way of a bottom side of the base resting onto a complimenting opening provided at the distal end of the shank for supporting the bottom side of the base. The complimenting opening can include a holder for receiving and supporting at least a portion of the bottom side of the base.

Figure 5:
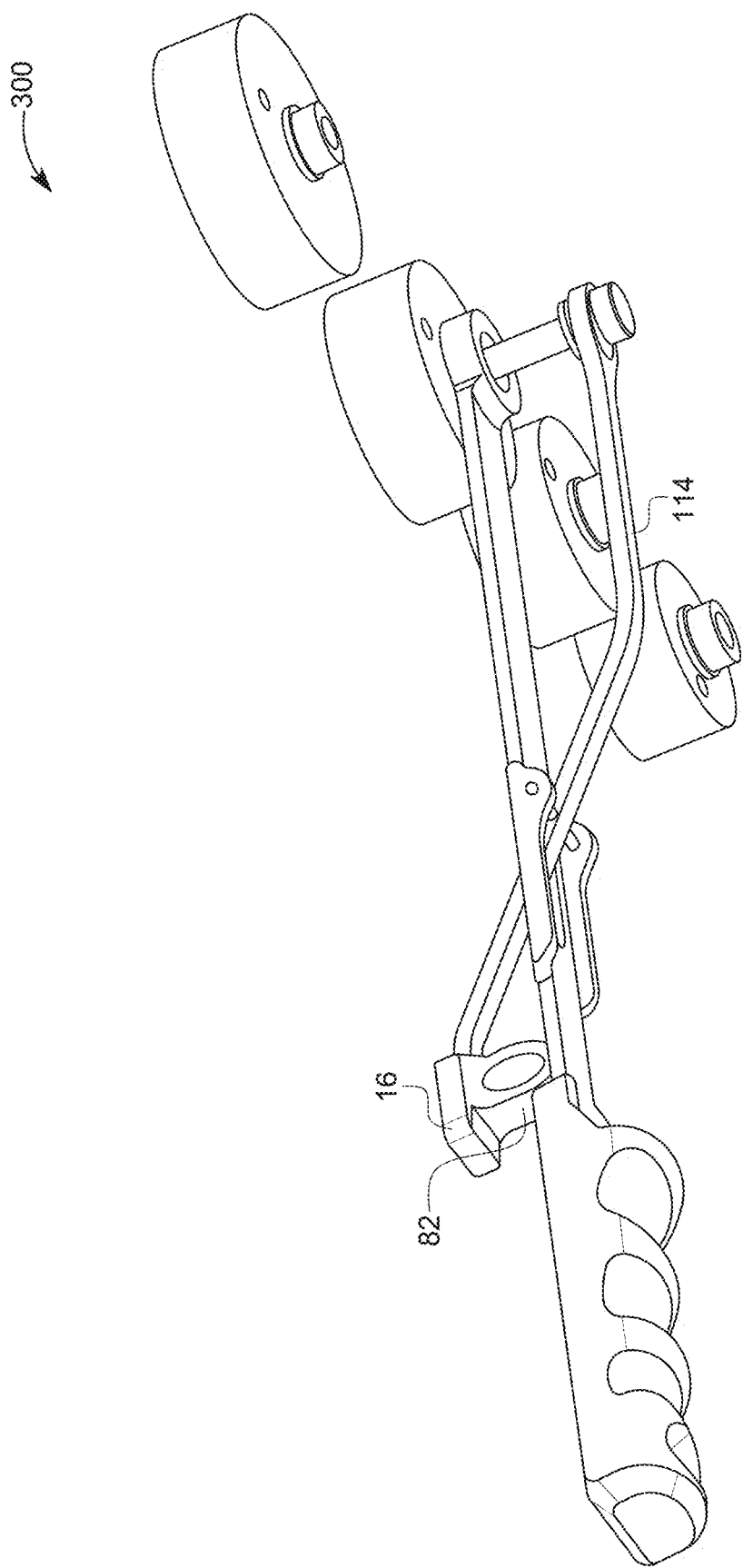
FIG. 5 is a bottom perspective view of another embodiment of a scooping device, according to at least one embodiment.
Figure 6:
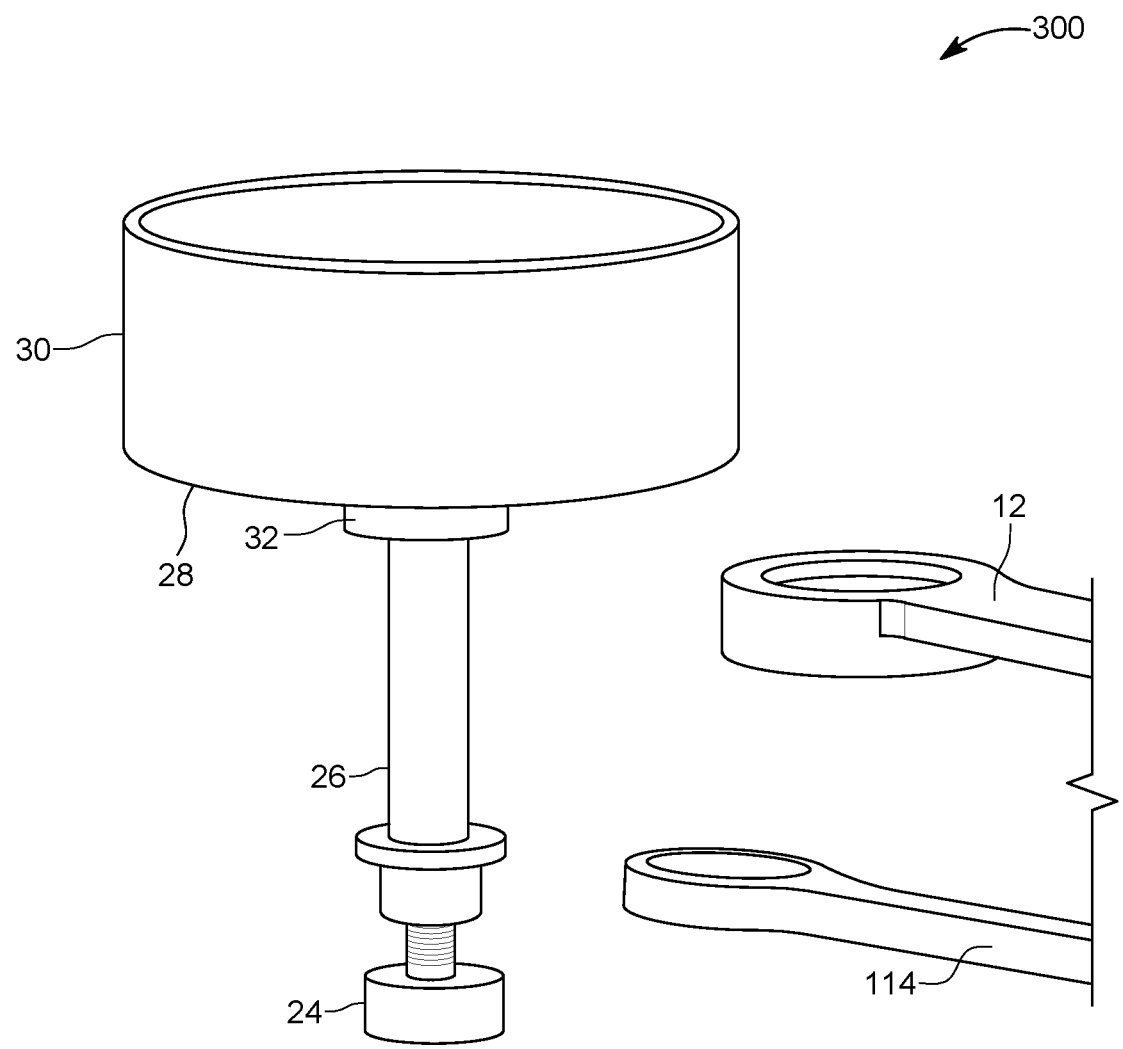
FIG. 6 is an exploded side perspective view of a portion of the scooping device of FIG. 5, according to at least one embodiment.
Figure 7:
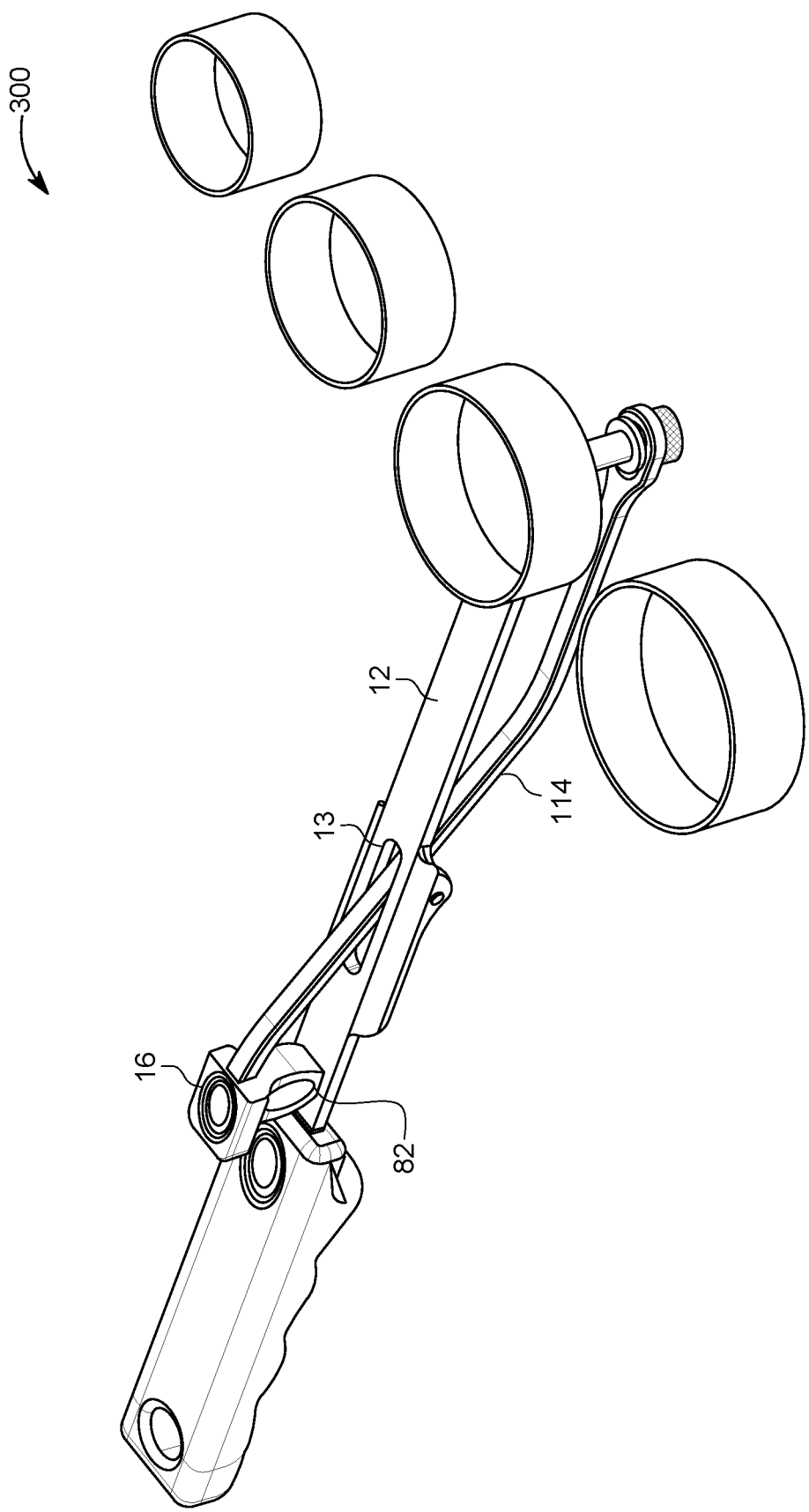
FIG. 7 is a top perspective view of the scooping device of FIG. 5, according to at least one embodiment.

FIGS. 5 through 7 illustrate another embodiment of a scooping device according to one or more embodiments of the presently disclosed subject matter. FIG. 5 illustrates a topside perspective view of device 300 and FIG. 6 illustrates an exploded view of the FIG. 5 embodiment. FIG. 7 illustrates a top side perspective view of device 300. The primary difference between scooping device 100 and scooping device 300 is that scooping device 300 does not include a biasing mechanism 44 positioned at a bottom side of base 28. Instead, as illustrated, for example, in FIG. 7 and FIG. 8, the biasing mechanism of device 300 comprises a silicone spring 82 that is integrated into, or otherwise forms of part of knob 16. In one embodiment, silicone spring 82 can be molded as part of knob 16. In one embodiment, the biasing mechanism in the form of a bent spring 72 (see FIG. 9). Bent spring 72 represents a custom bent spring that is screwed on to one or more of shank 12 and lever 14. In one embodiment, the biasing mechanism in the form of a compression spring 92 (see FIG. 10). Compression spring 92 can be integrated into, or otherwise form of part of knob 16.

Figure 11:
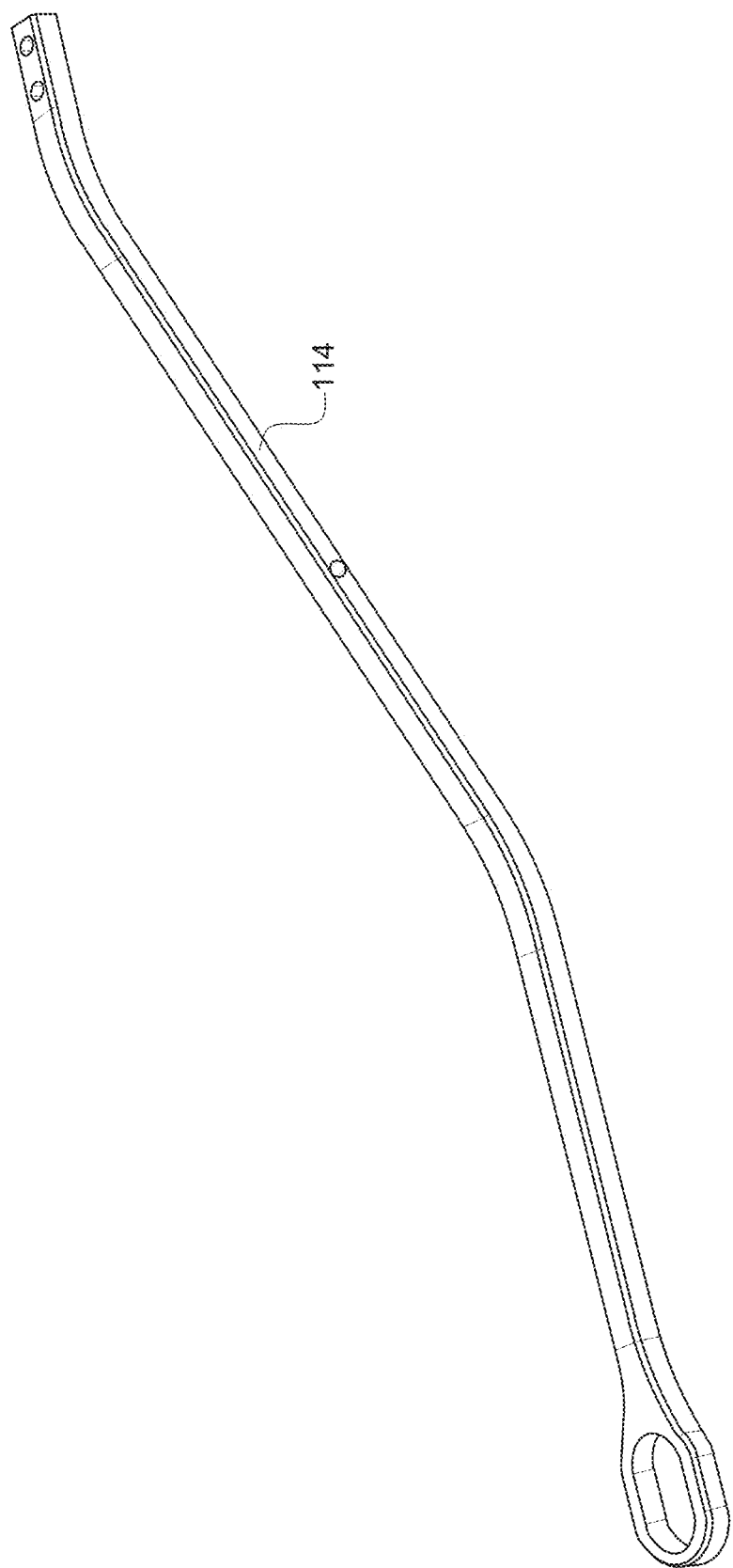
FIG. 11 is a side perspective view of a lever forming part of a scooping device, according to at least one embodiment.
Figure 12:
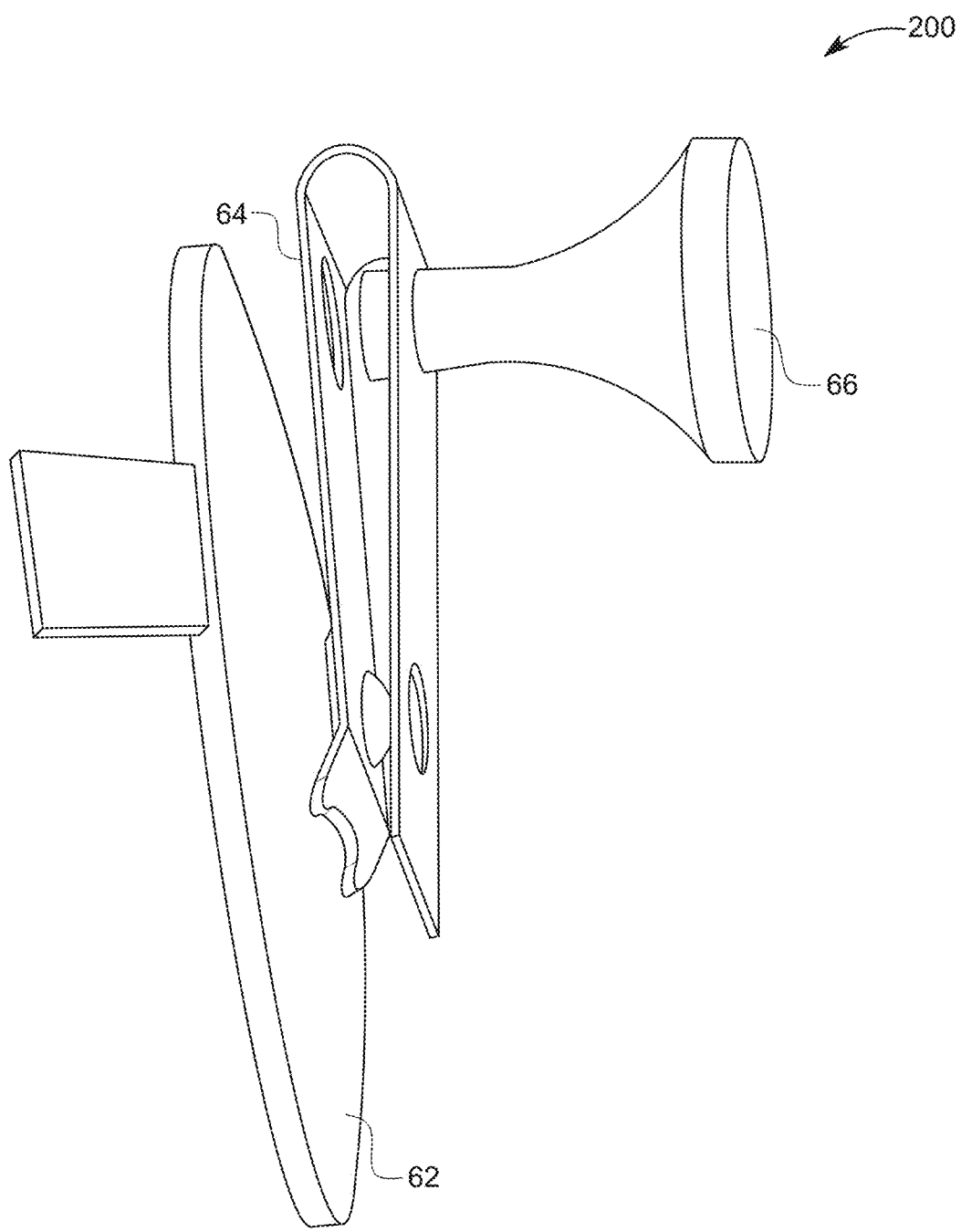
FIG. 12 is a side perspective view of a tamp device, according to at least one embodiment.

Further, as illustrated in FIG. 5, device 300 includes lever 114 formed as a single continuous element whereby it is easier to clean. FIG. 11 illustrates lever 114 formed as a single element. Lever 114 can accordingly replace lever 14 and connecting rod 22 illustrated in FIG. 1 with a single element by way of lever 114. Device 300 can otherwise possess the same or similar features as device 100.

In at least one embodiment, the selective engagement between the shank 12 of device 300 and the bowl 30 of device 300 takes the form of a bottom side of the base resting onto a complimenting opening provided at the distal end of the shank 12 for supporting the bottom side of the base (see FIG. 6). The complimenting opening can include a holder for receiving and supporting at least a portion 32 of the bottom side of the base, as illustrated in FIG. 6.

In various embodiments, the food item can represent a patty, a burger, a falafel, a dumpling, a dough item of any suitable shape, or any other food item that need to be dropped into a hot fluid for cooking purposes.

In some embodiments, the bowl has a cylindrical shape. However, the bowl can have other shapes including cubical, cuboidal, hemispherical, star-like, and similar other shapes. In some embodiments, a top side of the movable plate (i.e., the side of the movable plate that carries the scooped food item) has a concave shape. In various embodiments, device 100 comprises a plurality of bowls of varying sizes with a corresponding movable plate of a complimenting shape; this can advantageously allow for a same single device 100 to be used for frying patties and other food items of varying sizes.

In some embodiments, device 100 can be used for scooping various items to be baked in an oven; for example, device 100 can be used to shape baking items such brownies, cookies, and similar other edible items. In some embodiments, device 100 can also be used for scooping non-edible items to be baked in an oven; for example, device 100 can be used to scoop pottery or clay items to be baked in an oven. Indeed, the use of device 100 is not limited to scooping items explicitly mentioned herein; in other words, device 100 can be used for scooping any item—edible or otherwise—wherein efficiencies can be had by scooping such item using device 100. Similarly, device 100 can be used for scooping any item wherein efficiencies can be had by scooping such item using device 100—irrespective of whether the scooped item is to be subsequently dropped or placed in a frying or hot liquid and irrespective of whether the scooped item is to be subsequently baked in an oven or heated in some other manner.

Figure 13:
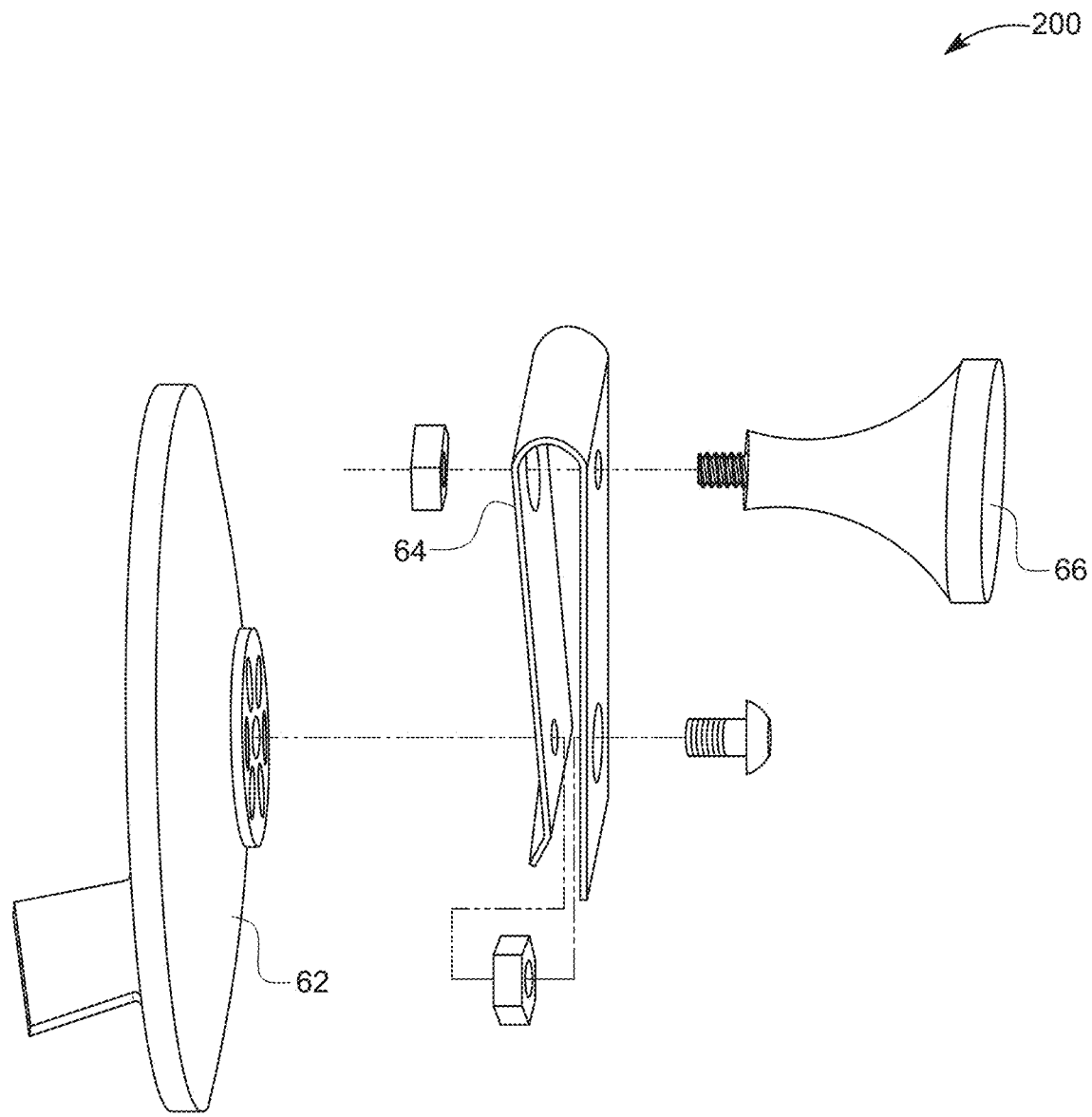
FIG. 13 is an exploded side perspective view of a tamp device illustrating various components of the tamp device, according to at least one embodiment.
Figure 14:
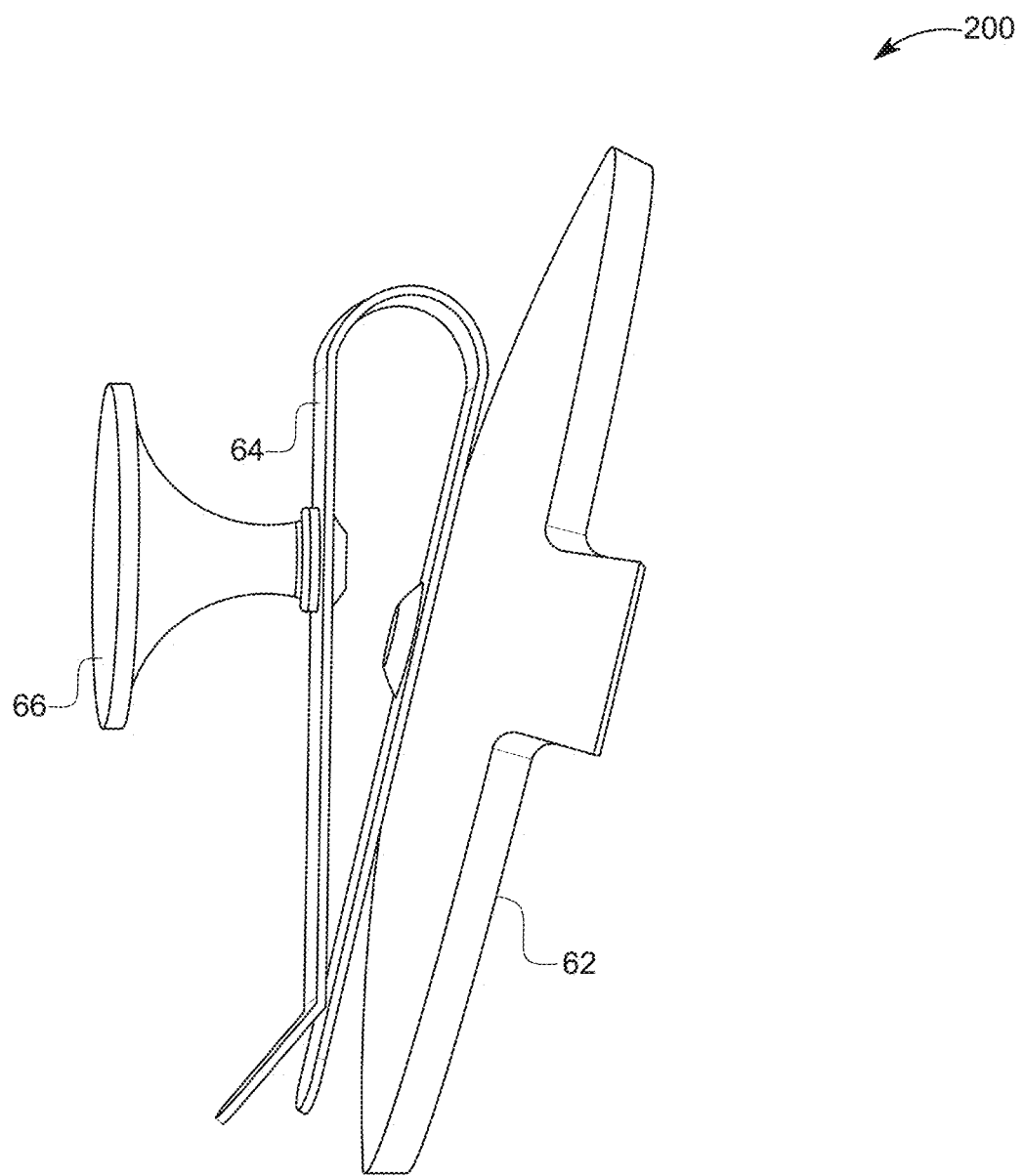
FIG. 14 is a side perspective view of a tamp device, according to at least one embodiment.
Figure 15:
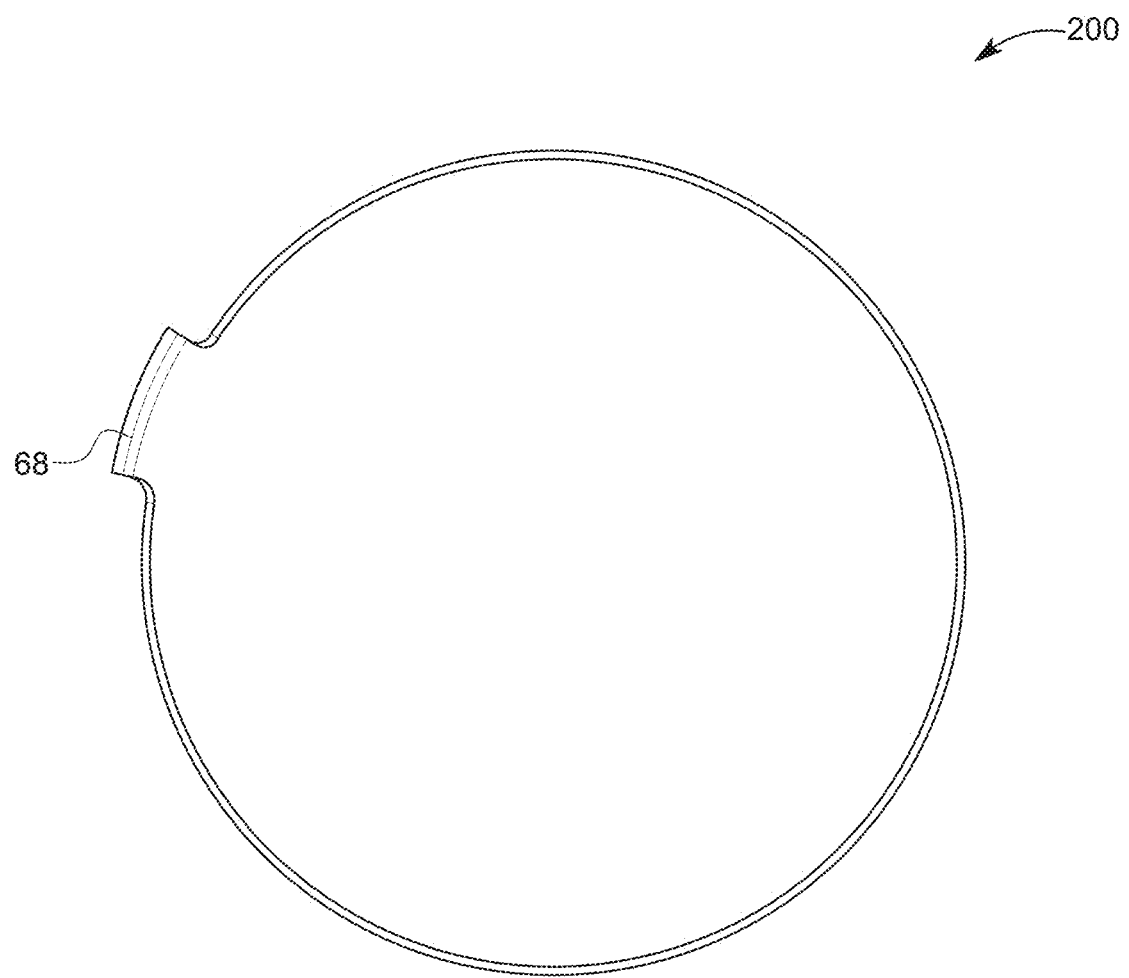
FIG. 15 is a front view of a tamp device, according to at least one embodiment.
Figure 16:
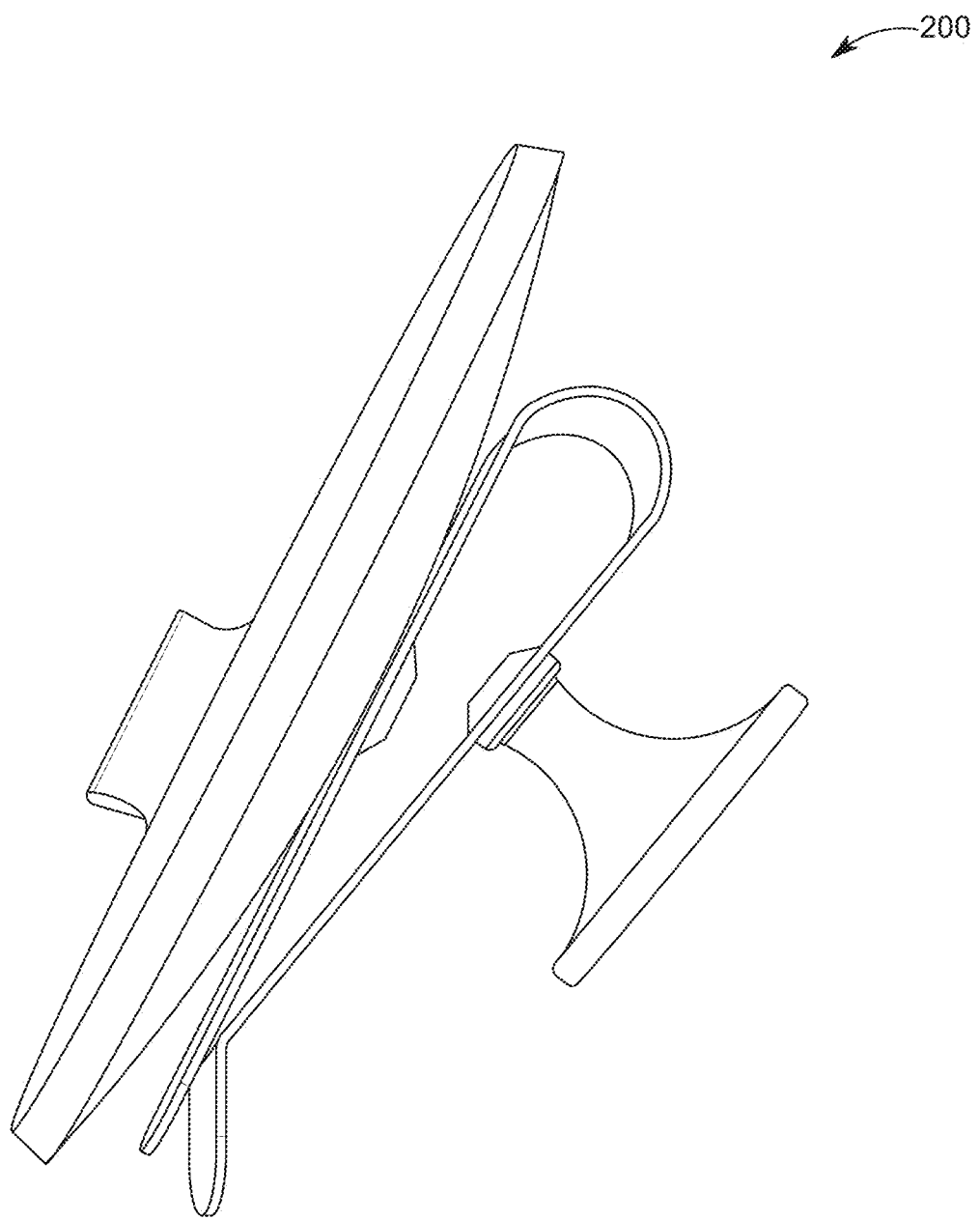
FIG. 16 is a side perspective view illustrating various components of a tamp device, according to at least one embodiment.
Figure 17:
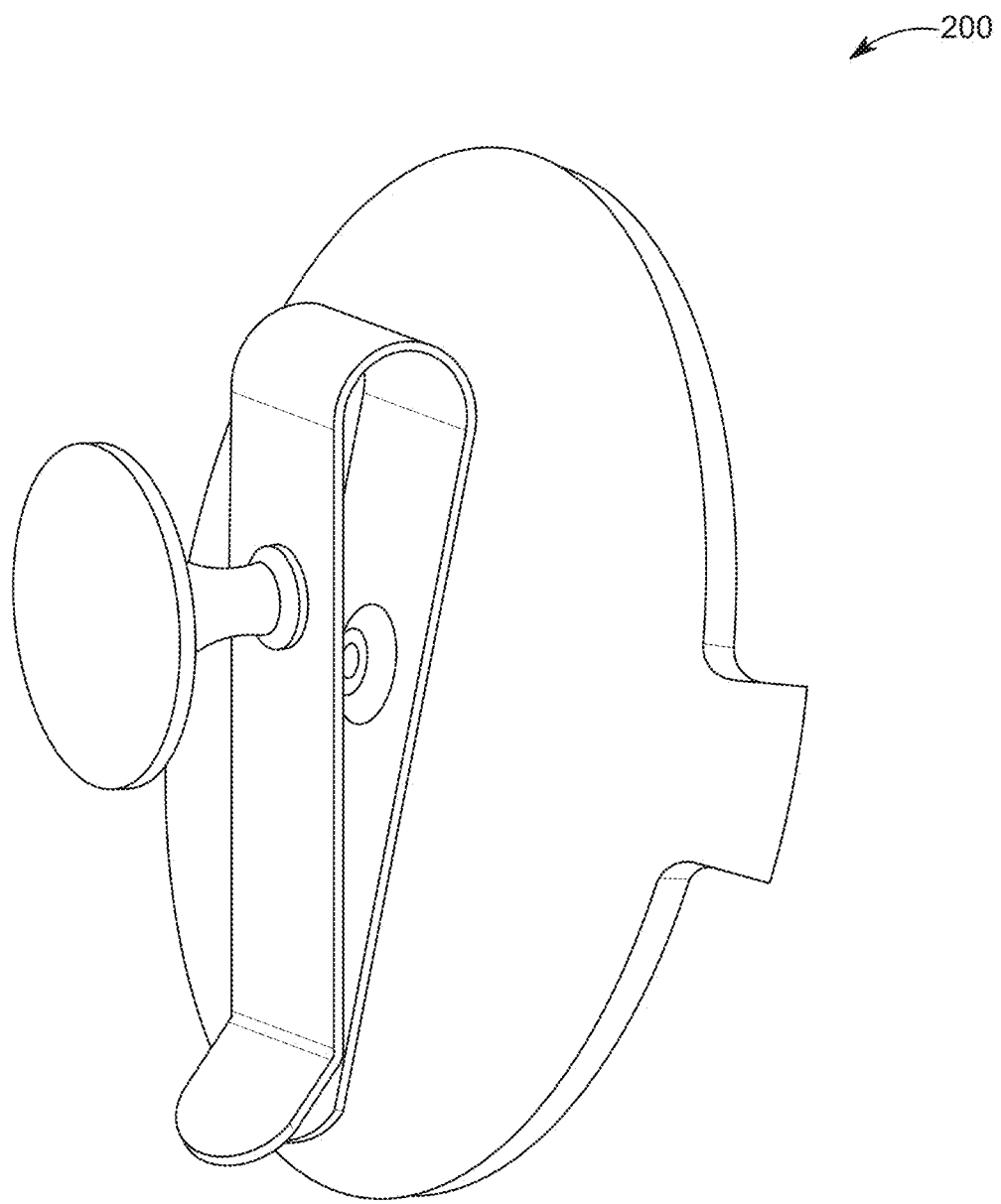
FIG. 17 is a rear perspective view illustrating various components of a tamp device, according to at least one embodiment.

Embodiments of the presently disclosed subject matter further include a tamp device 200 (alternately referred to herein as "device 200", "tamp device", or "second device") configured for shaping a food item to be dispensed into a hot fluid for cooking therein. As illustrated in FIG. 12 through FIG. 17, device 200 for shaping a food item (to be dispensed into a hot fluid for cooking therein) comprises a food shaping plate 62, a holder 66, and a clip 64 interconnecting a back side of the food shaping plate to the holder. According to at least one embodiment, holder 66 is configured for insertion between fingers of a person for holding the device in hand when a food item is being shaped against food shaping plate 62. According to at least one embodiment, clip 64 is configured for insertion into a rim of a container (e.g., a utensil) bearing the food item to be shaped. FIG. 13 is an exploded view corresponding to FIG. 12.

According to various embodiments, device 200 can be used in two modes. In a first mode, clip 64 can be clipped onto, or inserted onto, the rim or other suitable part of a container containing the food item to be shaped. After the clipping step is complete, the food item can be scooped and shaped against food shaping plate 62 before the food item is dispensed into a hot fluid for the purpose of cooking therein. In a second mode, an operator can slide holder 66 between the fingers of the operator to secure device 200 in one hand of the operator after which a food item can be scooped and shaped against food shaping plate 62 before the food item is dispensed into a hot fluid for the purpose of cooking therein.

In various embodiments, the food shaping plate is configured for shaping food items such as patties, dumplings, falafels, and similar other food items. In at least one embodiment, the food shaping plate can have a circular profile. However, the food shaping plate can have other shapes. In at least one embodiment, the food shaping plate includes a tab 68 extending from an edge thereof as illustrated, for example, in FIG. 15. Tab 68 is configured to limit movement of a scoop when a food item contained in the scoop is being shaped by pressing the food item against the food shaping plate. In at least one embodiment, the food shaping plate is concave shaped whereby the side of the food shaping plate against which a food item to be shaped is pressed against is imparted a complimenting convex shape after completion of the shaping of the food item. This can advantageously allow for better shaping of a food item to be dispensed into a hot fluid.

In various embodiments, the food item to be shaped can be carried by, or contained in, any scoop, spoon or similar other utensil. In one embodiment, the food item to be shaped can be carried by or contained in device 100; accordingly, in at least one embodiment, device 100 and device 200 can be used together as part of a system wherein device 100 and device 200 complement each other.

The scooper device (i.e., device 100) can be used by itself without the tamp device (i.e., device 200); similarly, the tamp device (i.e., device 200) can be used by itself without the scooper device (i.e., device 100). Device 200 can make it possible to shape a food item in an expeditious manner as compared to existing techniques for shaping a food item which may often be using the palm of the foodservice worker. Device 200 with its smooth shaping surface can allow a variety of food items be shaped therewith in an expeditious manner. In at least one embodiment, the circular profile and concave shape can make it easy to quickly shape the food item. Device 200 can be operated either by sliding it into the edge of any container or by holding it by hand. In one embodiment, device 100 can allow for a foodservice operator to use a one hand to scoop the food item using device 100 and shape the food item by pressing it against the shaping plate of device 200 while device 200 is held in the other hand of the worker by supporting the holder of device 200 between the fingers of the worker.

In various embodiments, device 100 and device 300 can be used interchangeably, for example, with or without device 200. Various components of device 100/300 and device 200 can be formed from a metal, such as a stainless steel or aluminum, for example. However, it will be understood that device 100/300 and device 200 may be formed from any resilient material, such as a plastic, for example, as desired. Various components of device 100/300 and device 200 can be separately formed and fixed together by one of a friction fit, an adhesive, soldering, welding, or the like.

In one embodiment, various components of device 100 and device 200 can include a coating adapted to militate against oxidation, corrosion, and/or tarnishing. In one embodiment, the coating may be an electroless plating applied using an electroless plating process. The electroless plating may be an electroless nickel plating formed from at least one layer of nickel-phosphorus and a nickel-boron alloy. The electroless plating may form a matte, semi-gloss, or gloss finish. In one embodiment, various components of device 100 and device 200 are dishwasher safe such that the devices can be safely washed in a dishwasher.

Embodiments of the presently disclosed subject matter further include a method of shaping and dispensing a food item into a hot fluid for cooking therein. In at least one embodiment, a method of shaping a food item and dispensing the food item into a hot fluid for cooking therein comprises the use of both device 100/300 and device 200. In various embodiments, the method comprises providing a first device 100/300 (i.e., the scooping device 100 or the scooping device 300). The first device 100/300 comprises a bowl having a permanent base and a movable plate positioned about the permanent base, a bottom of the bowl defining an opening for receiving a shaft extending therethrough. The shaft is coupled to the movable plate. A shank selectively engaged with the bowl, the shank having a handle at a proximal end thereof. A lever pivotably attaches to the shank at a medial portion thereof. The pivotal attachment is spaced apart from the bowl. The lever is detachably coupled to the shaft to impart translation of the movable plate. During operation, the lever is transferable between a first position in which a food item is contained within the bowl and a second position in which the lever is manipulated to push the shaft to move the movable plate to thereby eject the food item out of the bowl and into a hot fluid.

The method further comprises providing a second device 200 (i.e., the tamp device). Second device 200 comprises a food shaping plate, a holder, and a clip interconnecting a back side of the food shaping plate to the holder. The holder is configured for insertion between fingers for holding the device in hand when a food item is being shaped against the food shaping plate. The clip is configured for insertion into a rim of a container bearing the food to be shaped.

The method comprises filling the bowl of the first device with the food item; shaping the food item into a patty shape by pressing the food item against the food shaping plate of the second device; transferring the lever from the first position to the second position by manipulating the lever to push the shaft to move the movable plate; and, ejecting the food item out of the bowl and into a hot fluid.

According to at least one embodiment, the method also comprises inserting the clip into the rim of a container bearing the food item to be shaped. According to one embodiment, the method further comprises inserting the holder between the fingers of an operating for holding the second device in hand before shaping the food item into a patty shape. According to at least one embodiment, the method additionally comprises replacing the bowl of the first device with the second bowl. In one embodiment, the method also comprises detaching the shaft from the lever.

Embodiments of the presently disclosed subject matter as described herein can advantageously improve hygiene by providing a sanitary environment resulting from the long handle provided on device 100 whereby the food item is less likely to be touched by hands while the food item is being prepared. Embodiments of the presently disclosed subject matter can provide for enhancing the quality of the food item being cooked by shaping and smoothing of the food item with device 200 before it is dropped into the hot fluid. Embodiments of the presently disclosed subject matter can also provide for enhancing the appearance of the food item being cooked by use of device 100 and device 200.

Embodiments of the presently disclosed subject matter can provide for dispensing a food item into the hot oil by pressing the back of device 100 against the side of container containing the hot fluid such as oil, fat or boiling water. Alternately, the food item can be dispensed into the hot oil by pressing the lever of device 100 with the thumb. Under both scenarios, device 100 can be used/operated with a single hand.

Embodiments of the presently disclosed subject matter can be used effectively with very little training or kitchen knowledge. Embodiments of the presently disclosed subject matter can advantageously also operate to prolong the life of oil or liquid since the food item being cooked is less likely to break because it can be dropped from a very low height from the hot fluid, and further because the food item is packed tight by use of device 100 for shaping the food item. Embodiments of the presently disclosed subject matter can also enhance the speed of forming and frying/boiling due to ease of use of device 100 and device 200.

Embodiments of the presently disclosed can accordingly allow for the frying and boiling of food items such as patties in a convenient and safe manner by professional food service as well as novices. Embodiments of the presently disclosed subject matter can work well with floor fryers/ boilers widely used in typical professional kitchens.

From the foregoing description, one ordinarily skilled in the art can easily ascertain the essential characteristics of this invention and, without departing from the spirit and scope thereof, can make various changes and modifications to the invention to adapt it to various usages and conditions.

The embodiments as described herein are intended to be for illustrative purposes to disclose the intent of the design. Changes to design, geometry and operational processes could be carried out without digressing from the overall intent of the design.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A device for dispensing a food item into a hot fluid for cooking therein, the device comprising:
    a bowl having a base, wherein a bottom of the bowl defines an opening;
    a movable plate positioned about the base;
    a shaft coupled to the movable plate and extending through the opening defined by the bottom of the bowl;
    wherein the base defines an extending portion through which the opening is defined such that the shaft extends through the extending portion;
    a shank selectively engaged with the bowl such that a second bowl with a different shape may be replaceably engaged with the shank, the shank having a handle at a proximal end thereof, and a distal end selectively engaged with the bowl by receiving the extending portion of the base;
    a lever pivotably attached to the shank at a medial portion thereof, wherein a pivotal attachment is spaced apart from the bowl, and wherein the lever is configured to impart translation of the movable plate by operation of a proximal end of the lever by a finger or thumb; and
    a securing mechanism detachably coupling the lever to the shaft, the securing mechanism comprising a bolt that screws into a free end of the shaft;
    wherein, during operation, the lever is translatable between a first position in which the food item is contained within the bowl and a second position in which the lever is manipulated to push the shaft to move the movable plate to thereby eject the food item out of the bowl and into the hot fluid.

2. The device of claim 1, wherein the shank further includes a channel opening for the lever to pass therethrough at the pivotal attachment of the lever and shank.

3. The device of claim 1, wherein the food item is a patty.

4. The device of claim 1, wherein the device further comprises a biasing mechanism for transferring the lever from the second position to the first position when the lever is in a disengaged disposition.

5. The device of claim 4, wherein the biasing mechanism is one or more of:
    positioned on an underside of the shank, positioned on an underside of a knob provided on the lever, and coupled to a bottom side of the base.

6. The device of claim 4, wherein the biasing mechanism comprises one or more of: a bent spring, a compression spring, and a silicone spring.

7. The device of claim 1, wherein a top side of the movable plate has a concave shape.

8. The device of claim 1, wherein the hot fluid comprises a cooking oil, fat, or water.

9. A method of shaping and dispensing a food item into a hot fluid for cooking therein, the method comprising:
    providing a device comprising:
        a bowl having a base, wherein a bottom of the bowl defines an opening;
        a movable plate positioned about the base;
        a shaft coupled to the movable plate and extending through the opening defined by the bottom of the bowl;
        wherein the base defines an extending portion through which the opening is defined such that the shaft extends through the extending portion;
        a shank selectively engaged with the bowl such that a second bowl with a different shape may be replaceably engaged with the shank, the shank having a handle at a proximal end thereof, and a distal end selectively engaged with the bowl by receiving the extending portion of the base;
        a lever pivotably attached to the shank at a medial portion thereof, wherein the pivotal attachment is spaced apart from the bowl, and wherein the lever is configured to impart translation of the movable plate by operation of a proximal end of the lever by a finger or thumb; and
        a securing mechanism detachably coupling the lever to the shaft, the securing mechanism comprising a bolt that screws into a free end of the shaft;
        wherein, during operation, the lever is transferable between a first position in which the food item is contained within the bowl and a second position in which the lever is manipulated to push the shaft to move the movable plate to thereby eject the food item out of the bowl and into a hot fluid;
    filling the bowl of the device with the food item;
    transferring the lever from the first position to the second position by manipulating the lever to push the shaft to move the movable plate; and
    ejecting the food item out of the bowl and into the hot fluid.

10. The method of claim 9, further comprising replacing the bowl of the device with a second bowl.

11. The method of claim 9, further comprising detaching the shaft from the lever.

12. The method of claim 9, wherein the shank further includes a channel opening for the lever to pass therethrough at the pivotal attachment of the lever and shank.

* * * * *

UNITED STATES PATENT AND TRADEMARK OFFICE
CERTIFICATE OF CORRECTION

| | |
|---|---|
| PATENT NO. | : 11,432,681 B2 |
| APPLICATION NO. | : 17/139240 |
| DATED | : September 6, 2022 |
| INVENTOR(S) | : Nawwaf L. Said |

It is certified that error appears in the above-identified patent and that said Letters Patent is hereby corrected as shown below:

On the Title Page

In Line 2 of Item (63) "Related U.S. Application Data", "PCT/US2020/067328" should be replaced with --PCT/US2020/067628--.

Signed and Sealed this
Twenty-fifth Day of October, 2022

Katherine Kelly Vidal
*Director of the United States Patent and Trademark Office*